J. COZILETS.
MINE TIPPLE CAR.
APPLICATION FILED JULY 14, 1913.
1,141,442.
Patented June 1, 1915.
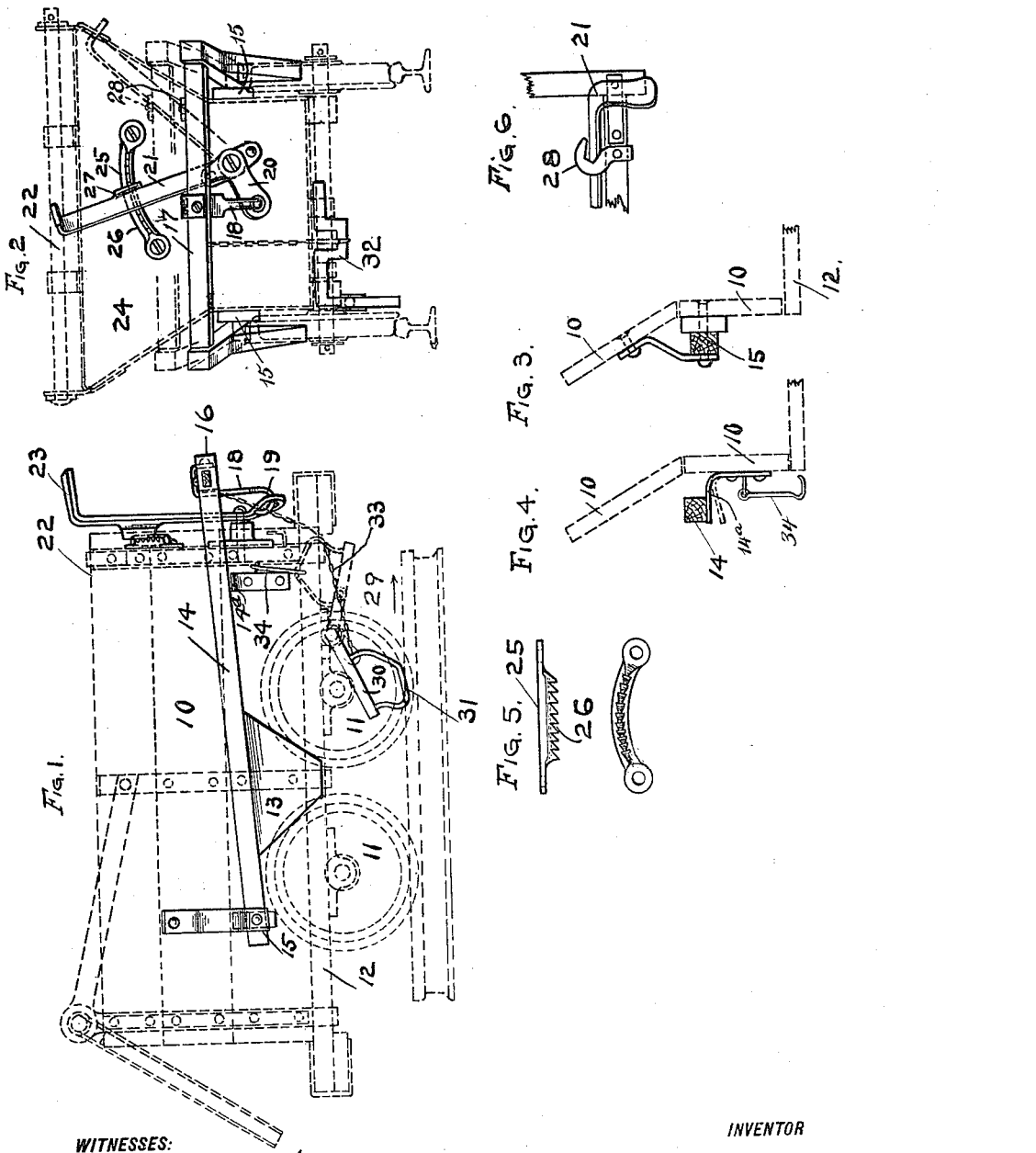
WITNESSES:
INVENTOR
JOHN COZILETS,
BY
ATTORNEY

UNITED STATES PATENT OFFICE.

JOHN COZILETS, OF COUPON, PENNSYLVANIA.

MINE TIPPLE-CAR.

1,141,442.　　　　Specification of Letters Patent.　　Patented June 1, 1915.

Application filed July 14, 1913. Serial No. 778,967.

*To all whom it may concern:*

Be it known that I, JOHN COZILETS, a subject of the King of Italy, residing at Coupon, in the county of Cambria and State of Pennsylvania, have invented certain new and useful Improvements in Mine Tipple-Cars, of which the following is a specification.

This invention relates to car brakes, and is specially adapted to the use of tipple cars, wherein the car is drawn up the incline by any suitable means, while the brake on the car is so arranged that should the cable, by which the car is drawn, break, the brake would at once become effective and stop the car.

To this end the invention contemplates a strong effective brake that is designed to be actuated by the car itself, thus eliminating any human element which is likely to fail at the instant the brake is most needed.

Another object of this invention is to provide means whereby the brake can be set from the top of the car and effectively locked in its service position.

A further object of this invention is to provide means for releasing the brakes after the brake levers have been disengaged.

With these and many other objects in view, the same consists of the novel construction, combination and arrangement of parts as will be hereinafter more fully pointed out and claimed.

The essential elements of this invention are quite susceptible to a wide range of structural modification without departing from the spirit or scope of the invention, but a preferred and thoroughly practical application of the invention is shown in the accompanying drawings, in which:—

Figure 1 shows a side elevation of a car with my invention applied thereto. Fig. 2 shows an end elevation of the parts shown in Fig. 1. Fig. 3 illustrates the manner of positioning the brake beam on the side of the car. Fig. 4 illustrates the manner in which the brake beam is lifted so as to pull the brake shoes away from the car wheels. Fig. 5 shows a plan and an elevational view of the brake lever segment. Fig. 6 is a detail view showing one type of hook used for holding the arms 21 in its operative position.

Like reference numerals designate corresponding parts throughout the several figures of the drawings.

When applying this brake to a car, to give the best results, I prefer to use the conventional form of tipple car designated by the numeral 10, having truck wheels 11 so positioned on the car frame 12 that one brake clog or shoe 13, readily engages both car wheels. The brake clog or shoe 13 I prefer to secure directly to the brake beam 14, which is fulcrumed at one end 15 and rests on the resilient support 14ª which holds it in normal position, while to the other end 16, I attach the cross beam 17, which has attached thereto a pendent arm 18, having a hook 19 to which the bell crank arm 20 of the brake lever 21, is secured. For the purpose of increasing the force with which the brakes are applied the arm 20, as compared to the arm 21, is comparatively short, thus the leverage is greatly multiplied. For the purpose of applying the brake by hand from the top 22 of the car, the lever 21 is provided with an arm 23 which is easily grasped by the operator. To further facilitate the hand braking feature, there is provided on the forward face 24 of the car a brake lever rack 25, having teeth 26, which engages the feathered portion 27 of the brake lever 21. For the purpose of holding the brake lever in its inoperative position and raising the arms 14 from the springs 14ª, any suitable means may be provided such as the hook 28 shown in Fig. 6 of the drawings which is adapted to engage the lever and hold it to one side of the rack 25, as shown by the dotted line position of the lever in Fig. 2.

For the purpose of providing against accidents which may happen due to run-away-cars on the tipple incline, I have shown an additional brake designated in its entirety by the numeral 29. This brake is in the form of a drag brake and is adapted to trail behind the car 10, while the same is being pulled up the incline, and at the instant the car starts back, the brake becomes effective and the car wheels are effectively locked. This brake 29 consists essentially of a pendent arm 30 to which is attached a drag shoe 31. The arm 30 being preferably an integral part of the yoke 32 to which a cable or chain 33 is attached, which pulls the brake beam down thus applying the brakes, as clearly shown in Figs. 1 and 2 of the drawings. For the purpose of holding the drag brake in an inoperative position, there is shown at the side of the car a pendent hook 34, which engages the shoe and holds the same effectively.

With further reference to the operation of the drag brake, it will be observed that the shoe 31 thereof is constructed so as to yield if it is in contact with the trackway when the car reverses its travel so as to reverse its own position and pull down on the cross bar 16 of the brake rigging. In other words, the shoe 31 is of stout spring metal and the brake 30 drags along the track-way as the car moves up the incline, and unless held up by the hook 34 will, upon the descent of the car down the incline, reverse its position, or assume the full line position shown in Fig. 1, and pull down on the cross bar 16 to apply the brake shoes 13. Thus, it will be apparent that the brake shoes 13 may be applied by hand through the medium of the handle 21 or by the drag brake 30 when the same is released from its engagement with the hook 34. That is to say, the arms 14 carrying the brake shoes 13 are supported on the spring bracket arms 14ª so that the said shoes 13 are normally held out of engagement with the wheels of the car, and are pushed into contact with the wheels by either the lever 21 or drage brake 30 against the supporting tendency of said spring bracket arms. The drag brake is only effective, or operative to apply the brake shoes 13 when the parts are as shown in Fig. 1 and the car goes in the direction of the arrow. When the car starts in the opposite direction with the drag brake 30 in the position shown in Fig. 1, the shoe 31 will yield and the drag brake will reverse its position and trail over the track-way.

It will here be noticed that there is thus provided two independent brake systems, either of which when properly applied will stop the car, and without further description or elaboration it is believed that the herein described brake will be readily understood, and

What I claim and desire to be secured by Letters Patent is;

1. A car brake mechanism including in combination with the car body, a frame pivoted thereto and having brake shoes, a lever connected to said frame for actuating the same, emergency brake means pivoted to the underside of the car body and adapted to engage with the trackway, flexible means connecting the said emergency brake means with the frame, the said emergency brake being automatically operated upon backward movement of the car.

2. A car brake mechanism including in combination with the car body, a frame comprising a pair of brake arms each pivoted at one end to the car body and connected to each other at the opposite end, a lever pivoted to the car body and connected to the said frame for actuating the same, emergency drag brake means carried by the car body and connected with said frame, said emergency brake being automatically operated upon backward movement of the car.

3. A car brake mechanism including in combination with the car body, a frame pivoted thereto and having brake shoes, a lever pivoted to the car body and connected with said frame, and emergency brake means carried by the underside of the car body and connected with said frame, said emergency brake means including a yoke pivoted to the car body, an arm integral therewith and depending therefrom, and a resilient drag brake shoe connected with the said arm, and adapted to engage with the trackway to apply the brake shoes carried by the frame, upon backward movement of the car.

In testimony whereof I affix my signature in presence of two witnesses.

JOHN COZILETS.

Witnesses:
JOHN BILL,
CHAS. W. MUNRO.